United States Patent
Kaya et al.

(10) Patent No.: US 7,128,964 B2
(45) Date of Patent: Oct. 31, 2006

(54) CARRIER FILM AND METHOD FOR ITS PRODUCTION

(75) Inventors: Seitoku Kaya, Ichihara (JP); Tutomu Fusyuku, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 75 days.

(21) Appl. No.: 10/763,171

(22) Filed: Jan. 26, 2004

(65) Prior Publication Data

US 2004/0151914 A1 Aug. 5, 2004

(30) Foreign Application Priority Data

Jan. 29, 2003 (JP) ............................. 2003-021062

(51) Int. Cl.
- *B32B 27/08* (2006.01)
- *B32B 27/36* (2006.01)
- *B32B 37/00* (2006.01)
- *B32B 37/12* (2006.01)

(52) U.S. Cl. .................. 428/216; 428/339; 428/421; 428/480; 428/910; 156/244.11

(58) Field of Classification Search ............... 428/216, 428/339, 421, 480, 910; 526/253; 156/244.11
See application file for complete search history.

(56) References Cited

U.S. PATENT DOCUMENTS

| 4,123,602 | A | * | 10/1978 | Ukihashi et al. ............. 522/187 |
| 4,388,375 | A | * | 6/1983 | Hopper et al. ............ 428/423.7 |
| 4,416,946 | A | | 11/1983 | Bolt ............................ 428/421 |
| 5,118,540 | A | | 6/1992 | Hutchison .................. 428/40.7 |
| 5,221,569 | A | | 6/1993 | Rohrka et al. .............. 428/215 |
| 2004/0213969 | A1 | * | 10/2004 | Nishio et al. ................ 428/202 |

FOREIGN PATENT DOCUMENTS

| JP | 6-226873 | 8/1994 |
| JP | 2002-67241 | 3/2002 |

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

A carrier film which is a laminated film having a film of a tetrafluoroethylene/ethylene copolymer laminated on each side of a stretched film of a polyester resin, wherein the haze of the laminated film is at most 5% as measured in accordance with JIS K7105.

17 Claims, No Drawings

CARRIER FILM AND METHOD FOR ITS PRODUCTION

The present invention relates to a carrier film excellent in transparency, solvent resistance and releasability.

A carrier film is a supporting film to be used for forming a cast film from a solution, and in order to obtain a flat smooth cast film, the carrier film is required to be excellent in characteristics such as surface smoothness, solvent resistance, releasability (or releasing properties), etc.

Heretofore, as a carrier film, a film of a fluorocarbon resin to be used for a release film (e.g. JP-A-6-226873) or a biaxially stretched polyethylene terephthalate film having a thin surface layer of a silicone compound (e.g. JP-A-2002-67241) has been, for example, used.

The film of a fluorocarbon resin is excellent in characteristics such as solvent resistance and releasability, but is usually expensive. It is possible to reduce the cost by reducing the thickness of the film of a fluorocarbon resin, but a thin film of a fluorocarbon resin has had a problem such that creases are likely to form, whereby the handling efficiency deteriorates. On the other hand, the biaxially stretched polyethylene terephthalate film having a thin surface layer of a silicone compound, has had a problem such that the silicone compound is likely to transfer to the surface of the cast film.

The cast film is required to have a high quality free from defects such as non-uniformity in film thickness, inclusion of dust, etc. Accordingly, a carrier film excellent in transparency is desired, so that such defects can be optically detected at the time of the production. JP-A-2002-67241 discloses a carrier film made of a stretched PET film having a surface layer of a fluorocarbon resin, which is produced by dry laminating a film of a fluorocarbon resin and a biaxially stretched polyethylene terephthalate film by means of an adhesive. However, with this carrier film, the transparency was inadequate.

It is an object of the present invention to solve the above problems and to provide a carrier film which is excellent in transparency and which is also excellent in solvent resistance and releasability.

The present invention provides a carrier film which is a laminated film having a film of a tetrafluoroethylene/ethylene copolymer laminated on each side of a stretched film of a polyester resin, wherein the haze of the laminated film is at most 5% as measured in accordance with JIS K7105.

Further, the present invention provides a method for producing such a carrier film, which comprises laminating a tetrafluoroethylene/ethylene copolymer on each side of a stretched film of a polyester resin by extrusion lamination.

The tetrafluoroethylene/ethylene copolymer (hereinafter referred to as ETFE) in the present invention is preferably a copolymer of tetrafluoroethylene (hereinafter referred to as TFE), ethylene (hereinafter referred to as E) and a fluorinated vinyl monomer copolymerizable therewith (provided that tetrafluoroethylene is excluded), wherein the molar ratio of polymerized units based on TFE/polymerized units based on E is 50-60/50-40, and the content of polymerized units based on the fluorinated vinyl monomer is from 2 to 7 mol % to the total polymerized units. Within this range, the carrier film will be excellent in transparency, solvent resistance and releasability.

The molar ratio of polymerized units based on TFE/polymerized units based on E is more preferably 53-60/47-40. The content of polymerized units based on the fluorinated vinyl monomer is more preferably from 2 to 5 mol % to the total polymerized units.

The fluorinated vinyl monomer is preferably a (per fluoroalkyl)ethylene of the formula $CH_2=CH-C_nF_{2n+1}$ (wherein n is an integer of from 2 to 10). By the incorporation of polymerized units based on the fluorinated vinyl monomer, the carrier film will be excellent in transparency, solvent resistance and releasability. n is more preferably from 2 to 6. As a specific example, $CH_2=CH-C_2F_5$, $CH_2=CH-C_3F_7$, $CH_2=CH-C_4F_9$, $CH_2=CH-C_5F_{11}$ or $CH_2=CH-C_6F_{13}$ may, for example, be mentioned. More preferred is $CH_2=CH-C_4F_9$.

As the stretched film of a polyester resin in the present invention, a stretched film of a polyester resin such as a polyethylene terephthalate (hereinafter referred to as PET), a polyethylene naphthalate, a polybutylene terephthalate or a polybutylene naphthalate, may be mentioned. Among them, a stretched film of PET (hereinafter referred to also as a stretched PET film) is preferred, since it is not only excellent in thickness precision, thermal properties, mechanical properties, etc., but also inexpensive.

The thickness of the stretched film of a polyester resin (hereinafter referred to also as the stretched polyester resin film) in the present invention is preferably from 10 to 100 μm more preferably from 25 to 50 μm. If the thickness of the stretched polyester resin film is too thin, the handling efficiency deteriorates, and if it is too thick, the thickness precision of the carrier film deteriorates. When the thickness is within this range, the carrier film will be excellent in handling efficiency and thickness precision. As the stretching method for the film of a polyester resin, monoaxial or biaxial stretching may be mentioned, and biaxial stretching is more preferred. The biaxially stretched polyester resin film is preferred since it is excellent in tensile break strength, transparency, etc.

The carrier film of the present invention is preferably produced by laminating ETFE on each side of the stretched polyester resin film by extrusion lamination. The extrusion lamination means that a film of ETFE is extrusion-molded by means of an extruder, and the ETFE film immediately after the molding is overlaid on the stretched polyester resin film and inserted between rolls for lamination.

In the extrusion lamination, it is preferred to use an adhesive to bond the stretched polyester resin film and the ETFE film. It is preferred to use the adhesive, since it is thereby possible to obtain a carrier film having a high interlayer bond strength between the ETFE film and the stretched polyester resin film. As such an adhesive, a polyester adhesive, a polyurethane adhesive or an acrylic adhesive may, for example, be mentioned. Among them, a polyester adhesive is particularly preferred. As a specific example of the polyester adhesive, AG-9014A manufactured by Asahi Glass Company, Limited, PES111SK-20, PES140, or PES120, manufactured by Toagosei Co., Ltd., may, for example, be mentioned.

As a production process, the following specific example may be mentioned. A polyester adhesive is coated on a biaxially stretched PET film by a gravure roll, followed by drying to prepare a biaxially stretched PET film having an adhesive layer on one side (hereinafter referred to as a one side adhesive PET film), which is wound into a roll. Such a roll is set on an unwinder. A film of ETFE extrusion-molded by means of an extruder, is put on the adhesive-coated side of the one side adhesive PET film dispensed from the unwinder immediately after the molding, followed by insertion between a heated metal roll and a water-cooled silicone rubber back roll for lamination, whereupon the double layer laminated film is wound into a roll. Then, the same operation is carried out on the other side of the biaxially stretched PET film to obtain a three layer laminated film of ETFE film/stretched polyester resin film/ETFE film, as an example of the carrier film of the present invention.

Here, the thickness of the adhesive layer is preferably from 0.1 to 5 μm, more preferably from 0.3 to 2 μm. The heating temperature of the metal roll is preferably from 100 to 170° C., more preferably from 120 to 150° C. The winding speed of the laminated film is preferably from 5 to 30 m/min, more preferably from 15 to 20 m/min.

The thickness of the ETFE film in the carrier film of the present invention, is preferably from 1 to 10 μm, more preferably from 1 to 7 μm, most preferably from 1 to 5 μm. If the thickness is within this range, the carrier film will be excellent in abrasion resistance, whereby there will be no formation of pinholes during the extrusion lamination, and good characteristics such as releasability of ETFE, non-tackiness, etc. can be maintained.

The thickness of the carrier film of the present invention is preferably from 10 to 200 μm, more preferably from 12 to 150 μm, most preferably from 15 to 100 μm. If the thickness is within this range, the handling efficiency will be excellent.

With the carrier film of the present invention, the haze is at most 5%, preferably at most 4%, more preferably at most 3%, as measured in accordance with JIS K7105. If the haze is within this range, the film is excellent in transparency, and when defects of the cast film are to be optically inspected, the S/N ratio of the optical tester tends to be improved. The haze to be measured in accordance with JIS K7105, is a value represented by the ratio of the diffuse transmittance and the total light transmittance measured by means of an integrating sphere light transmittance-measuring apparatus.

With the carrier film of the present invention, the interlayer bond strength between the polyester resin film and the ETFE film is preferably from 3 to 80 g/cm, more preferably from 6 to 60 g/cm, most preferably from 10 to 40 g/cm. If it is within this range, the interlayer peeling scarcely takes place during use, and durability in use will be excellent.

The carrier film of the present invention is useful as e.g. a solvent-resistant release film, a readily releasing film, a heat resistant release film, an acid resistant release film or an alkali resistant release film. Particularly preferred is a readily releasing carrier film whereby a film formed by casting from a solution of a composition comprising inorganic particles and a binder, can be readily released, or a solvent-resistant carrier film which is useful at the time of casting a polymer film from a solution.

Now, the present invention will be described in detail with reference to Examples. However, the present invention is by no means restricted by such specific Examples. Further, the following methods were used for measurements of the releasability, the haze, the break strength and the elongation of the carrier film.

Releasability: An addition-reaction type curable liquid silicone rubber (KE1988(A/B), manufactured by Shin-Etsu Chemical Co., Ltd.) was dissolved in a solvent mixture of methyl ethyl ketone/methyl isobutyl ketone/toluene (mass ratio: 25/25/50) to obtain a solution having a solid content concentration of 5 mass %. The solution was coated on a laminated film and dried at 150° C. for 1 minute to cure the silicone. Then, the silicone was manually peeled from the laminated film, whereby the releasability of the laminated film was evaluated. A case where the film was readily peeled, was represented by ○, and a case where the film was hardly peeled, was represented by X.

Haze (%): Using SM color computer SM-5, manufactured by Suga Test Instruments Co., Ltd., the haze of the laminated film was measured in accordance with JIS K7105.

Break strength and elongation: The break strength and the elongation of the carrier film were measured in accordance with ASTM D-638. MD represents the extruded direction of the film, and TD represents the width direction of the film.

EXAMPLE 1

On one side of a biaxially stretched PET film having a thickness of 38 μm and a width of 1,200 mm (GEC38, manufactured By Teijin Limited), a polyester adhesive (AG-9014A, manufactured by Asahi Glass Company, Limited) was coated so that the thickness of the dried coated film would be 0.4 μm. The obtained adhesive-coated PET film was set in an extrusion lamination apparatus.

ETFE having a polymer composition of polymerized units based on TFE/polymerized units based on E/polymerized units based on (perfluorobutyl)ethylene (hereinafter referred to as PFBE)=56.3/40.7/3.0 (molar ratio), was melt-extruded at 320° C., and a lip was adjusted so that the film thickness of the extruded ETFE film would be 4 μm. The extruded ETFE film was laminated on the adhesive-coated side of the PET film at 130° C. by means of a back roll.

The same operation was carried out on the other side of the biaxially stretched PET to obtain a carrier film made of a three layer laminated film of ETFE film/biaxially stretched PET film/ETFE film. The thickness of the ETFE layer was 4 μm, and the thickness of the biaxially stretched PET layer was 38 μm, and the thickness of the carrier film was 46.8 μm. The haze and releasability were measured, and the results are shown in Table 1. No creases or no swelling was observed on the surface of the carrier film after the release test, whereby it was found to be excellent in solvent resistance. The obtained silicone rubber cast film had a smooth surface free from defects such as creases or flares (large wavings).

COMPARATIVE EXAMPLE 1

A laminated film having a ETFE film laminated on each side of a biaxially stretched PET film, was obtained in the same manner as in Example 1 except that ETFE having a composition of polymerized units based on TFE/polymerized units based on E/polymerized units based on PFBE=52.3/46.4/1.3 (molar ratio), was used. The haze and releasability were measured, and the results are shown in Table 1.

TABLE 1

| | ETFE composition (molar ratio) TFE/E/PFBE | Haze (%) | Releasability | Break strength MD/TD (MPa) | Elongation MD/TD (%) |
|---|---|---|---|---|---|
| Ex. 1 | 56.3/40.7/3.0 | 3.1 | ○ | 163/183 | 140/120 |
| Comp. Ex. 1 | 52.3/46.4/1.3 | 5.7 | ○ | 186/180 | 152/120 |

The carrier film of the present invention is excellent in transparency and excellent in solvent resistance and releasability. During the production, optical detection of defects of the cast film is easy.

The entire disclosure of Japanese Patent Application No. 2003-21062 filed on Jan. 29, 2003 including specification, claims and summary is incorporated herein by reference in its entirety.

What is claimed is:

1. A carrier film which is a laminated film having a film of a tetrafluoroethylene/ethylene copolymer laminated directly to each side of a stretched film of a polyester resin with or without the use of an adhesive in the lamination process, wherein the haze of the laminated film is at most 5% as measured in accordance with JIS K7105, wherein if an adhesive is utilized in the lamination process, the adhesive is at least one selected from the group consisting of a polyester adhesive, a polyurethane adhesive and an acrylic adhesive and wherein the tetrafluoroethylene/ethylene copolymer is a copolymer of tetrafluoroethylene, ethylene and a fluorinated vinyl monomer copolymerizable therewith (provided that tetrafluoroethylene is excluded), wherein the molar ratio of polymerized units based on tetrafluoroethylene/polymerized units based on ethylene is 50-60/50-40, and the content of polymerized units based on the fluorinated vinyl monomer is from 2 to 7 mol % to the total polymerized units.

2. The carrier film according to claim 1, wherein the fluorinated vinyl monomer is a (perfluoroalkyl)ethylene of the formula $CH_2=CH-C_nF_{2n+1}$ (wherein n is an integer of from 2 to 10).

3. The carrier film according to claim 1, wherein the thickness of the film of a polyester resin is from 10 to 100 μm.

4. The carrier film according to claim 3, wherein the polyester resin is a polyethylene terephthalate.

5. The carrier film according to claim 1, wherein the polyester resin is a polyethylene terephthalate.

6. The carrier film according to claim 1, wherein the thickness of the film of a tetrafluoroethylene/ethylene copolymer is from 1 to 10 μm.

7. The carrier film according to claim 6, wherein the tetrafluoroethylene/ethylene copolymer is a copolymer of tetrafluoroethylene, ethylene and a fluorinated vinyl monomer copolymerizable therewith (provided that tetrafluoroethylene is excluded), wherein the molar ratio of polymerized units based on tetrafluoroethylene/polymerized units based on ethylene is 50-60/50-40, and the content of polymerized units based on the fluorinated vinyl monomer is from 2 to 7 mol % to the total polymerized units.

8. The carrier film according to claim 7, wherein the fluorinated vinyl monomer is a (perfluoroalkyl)ethylene of the formula $CH_2=CH-C_nF_{2n+1}$ (wherein n is an integer of from 2 to 10).

9. The carrier film according to claim 1, wherein the thickness of the carrier film is from 10 to 200 μm.

10. The carrier film according to claim 9, wherein the thickness of the film of a tetrafluoroethylene/ethylene copolymer is from 1 to 10 μm.

11. A method for producing the carrier film as defined in claim 1, which comprises laminating a tetrafluoroethylene/ethylene copolymer on each side of a stretched film of a polyester resin by extrusion lamination.

12. The method for producing the carrier film according to claim 11, wherein the thickness of the carrier film is from 10 to 200 μm.

13. The method for producing the carrier film according to claim 12, wherein the thickness of the stretched film of a polyester resin is from 10 to 100 μm.

14. The method for producing the carrier film according to claim 12, wherein the thickness of the film of a tetrafluoroethylene/ethylene copolymer is from 1 to 10 μm.

15. A carrier film which is a laminated film having a film of a tetrafluoroethylene/ethylene copolymer in a thickness of from 1 to 10 μm laminated on each side of a stretched film of a polyester resin in a thickness of from 10 to 100 μm, wherein the haze of the laminated film is at most 5% as measured in accordance with JIS K7105 and wherein the tetrafluoroethylene/ethylene copolymer is a copolymer of tetrafluoroethylene, ethylene and a fluorinated vinyl monomer copolymerizable therewith (provided that tetrafluoroethylene is excluded), wherein the molar ratio of polymerized units based on tetrafluoroethylene/polymerized units based on ethylene is 50-60/50-40, and the content of polymerized units based on the fluorinated vinyl monomer is from 2 to 7 mol % to the total polymerized units.

16. The carrier film according to claim 15, wherein the fluorinated vinyl monomer is a (perfluoroalkyl)ethylene of the formula $CH_2=CH-C_nF_{2n+1}$ (wherein n is an integer of from 2 to 10).

17. The carrier film according to claim 15, wherein the polyester resin is a polyethylene terephthalate.

* * * * *